(12) United States Patent
Bober et al.

(10) Patent No.: US 12,056,450 B1
(45) Date of Patent: Aug. 6, 2024

(54) MESSAGE CONTENT REDUCTION USING MESSAGE TEMPLATES

(71) Applicant: Dell Products L.P., Round Rock, TX (US)

(72) Inventors: Roman Bober, Ha-Darom (IL); Eli Rosenes, Bet Shemesh (IL); Lior Gdaliahu, Modi'in (IL); Yonit Lopatinski, Shomria (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/326,250

(22) Filed: May 31, 2023

(51) Int. Cl.
*G06F 40/186* (2020.01)
*H04L 51/21* (2022.01)

(52) U.S. Cl.
CPC ............ *G06F 40/186* (2020.01); *H04L 51/21* (2022.05)

(58) Field of Classification Search
None
See application file for complete search history.

(56) References Cited

U.S. PATENT DOCUMENTS

| 11,270,067 | B1* | 3/2022 | Paul ..................... G06F 40/186 |
| 2014/0380145 | A1* | 12/2014 | Wilsher ................... H04L 51/18 715/234 |
| 2022/0121507 | A1* | 4/2022 | Jha .......................... G06F 9/546 |
| 2022/0224663 | A1* | 7/2022 | Liu ......................... H04L 51/23 |

OTHER PUBLICATIONS

Kobayashi et al., "amulog: A General Log Analysis Framework for Diverse Template Generation Methods" copyright 2020 IFIP, 5 pages. (Year: 2020).*
Yan et al., "Effective Techniques for Message Reduction and Load Balancing in Distributed Graph Computation"; ACM Classes D.4.7; https://arxiv.org/abs/1503.00626; dated Mar. 2, 2015.
"SSL(MarketFeed) vs RSSL(OMM) Message Size Reduction"; https://community.developers.refinitiv.com/questions/42896/sslmarketfeed-vs-rsslomm-message-size-reduction.html; downloaded on May 25, 2023.
"Replacing the Standard Message Texts"; UNICOM Intelligence; https://support.unicomsi.com/manuals/intelligence/75/index.html#/page/Desktop%20User%20Guides/InterviewScripting1.043.187.html; downloaded on May 25, 2023.

* cited by examiner

*Primary Examiner* — Amelia L Tapp
(74) *Attorney, Agent, or Firm* — Ryan, Mason & Lewis, LLP

(57) ABSTRACT

Techniques are provided for message content reduction using message templates. One method comprises obtaining a message of a given type, of multiple types, to be transmitted over a network; identifying one or more templates, of multiple templates, for the given type, wherein the templates comprise a respective message identifier; selecting a given template of the given message type based on a similarity of the message with the given template; updating the message by (i) incorporating the message identifier of the given template into the message and (ii) removing one or more fields of the message that match respective fields of the given template; and transmitting the updated message to a recipient device. The recipient device may determine whether the updated message comprises the message identifier, and may retrieve a message template using the message identifier. The recipient device may store the updated message as a template in a message cache.

20 Claims, 9 Drawing Sheets

MESSAGE CONTENT REDUCTION USING MESSAGE TEMPLATES

FIELD

The field relates generally to information processing systems, and more particularly to communications in such information processing systems.

BACKGROUND

In many computing environments, such as an edge-cloud computing environment, a high volume of data often needs to be transmitted. Such data may include, for example, messages transmitted among edge devices and messages transmitted to a central server of a cloud for processing and/or storage. The high volume of data may strain the network bandwidth and/or network security, leading to potential scalability and/or reliability issues.

SUMMARY

In one embodiment, a method comprises obtaining a message of a given message type, of a plurality of message types, to be transmitted over a network, wherein the message comprises a plurality of fields; identifying at least one message template, of a plurality of message templates, for the given message type, wherein the at least one message template comprises a message instance identifier; selecting a given one of the at least one message template of the given message type based at least in part on a similarity of content of the message with content of the given message template; updating the message to be transmitted by (i) incorporating the message instance identifier of the given message template into the message to be transmitted and (ii) removing one or more fields of the message to be transmitted that match corresponding fields of the given message template; and transmitting the updated message to a recipient device.

In some embodiments, the method further comprises determining whether a message cache storing the plurality of message templates comprises a message template of the given message type. The message of the given message type may be stored as a message template in the message cache in response to the message cache not comprising a message of the given message type. A determination may be made of whether a synchronization timeout period, for the given message type, has been exceeded and the message may be transmitted to the recipient device in response to the synchronization timeout period being exceeded.

In one or more embodiments, the recipient device determines whether the updated message comprises the message instance identifier. The recipient device may retrieve a message template from the message cache corresponding to the message instance identifier in response to the updated message comprising the message instance identifier. The recipient device may store the updated message as a message template in the message cache in response to the updated message not being in the message cache.

In at least one embodiment, the message type identifier of the at least one message template is based at least in part on a message-dependent function applied to content of the at least one message template. The given message type of the message to be transmitted may be obtained by applying the message-dependent function to the message to be transmitted to obtain a message-dependent value, wherein the identifying the at least one message template for the given message type may comprise identifying a collection of the at least one message template using the message-dependent value and the selecting the given message template of the given message type may be based at least in part on a similarity of content of the message to be transmitted relative to content of the of the at least one message in the collection.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for message content reduction using message templates.

One or more embodiments of the disclosure improve the scalability and/or reliability of a computing environment, such as an edge computing environment and/or a cloud computing environment, by reducing the amount of data that needs to be transmitted using a network. The disclosed message content reduction techniques reduce the amount of redundant and/or unnecessary data that is transmitted to a recipient device, thereby reducing network congestion, improving network performance and/or enhancing the user experience.

In some embodiments, a message template cache holds message templates and a new message is generated using a selected message template as a base message, where the selected message template is selected based at least in part on a similarity of content with the new message. The new generated message may include an identifier of a selected message template and one or more unique fields (e.g., fields of a new message that have different values relative to the selected message template).

Figure 1:
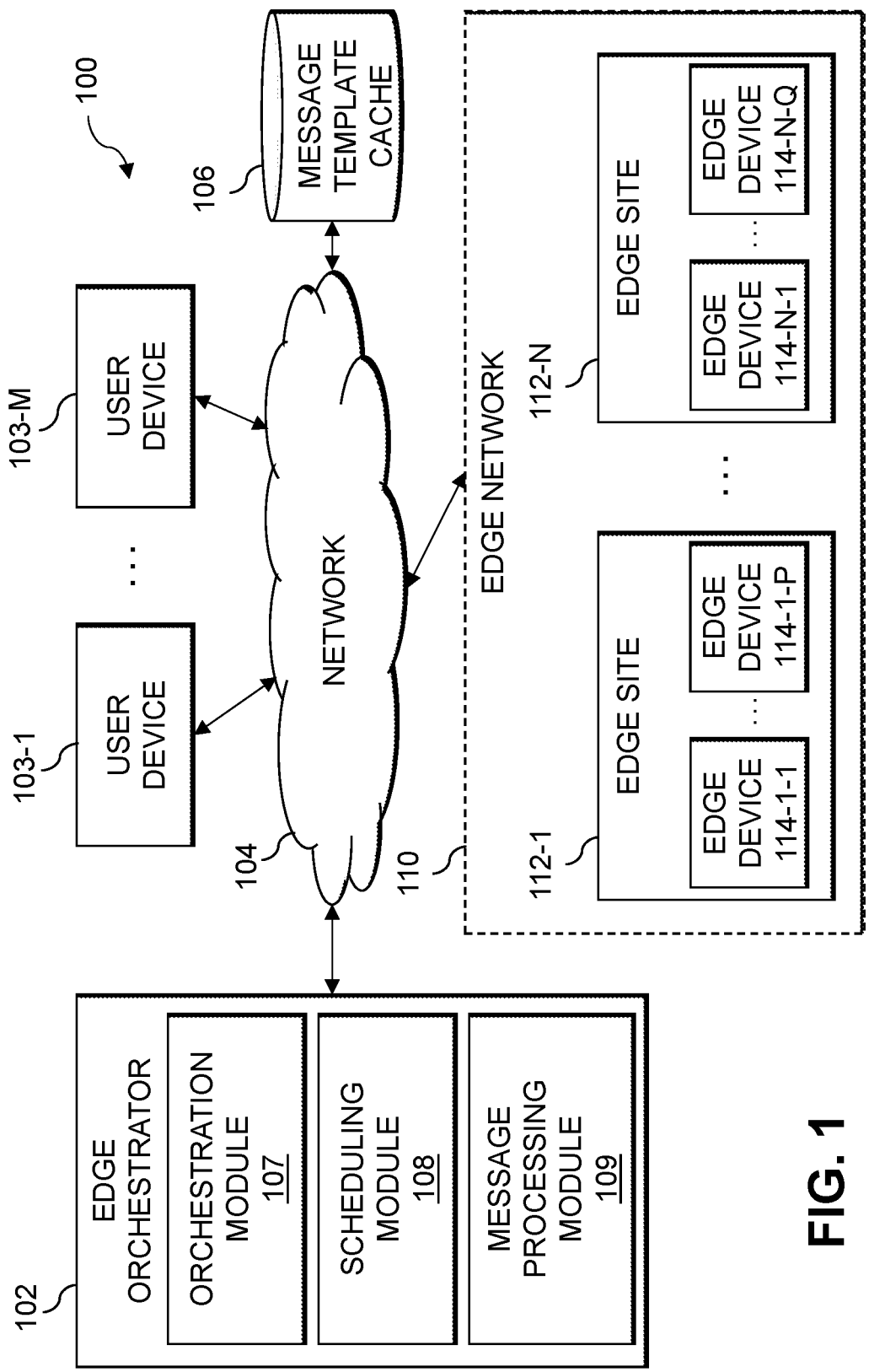
FIG. 1 illustrates an information processing system configured for message content reduction using message templates in an illustrative embodiment.

FIG. 1 shows a computer network (also referred to herein as an information processing system) 100 configured in an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 are one or more edge orchestrators 102, one or more edge networks 110 and one or more message template caches 106, discussed below.

The user devices 103 may comprise, for example, physical computing devices such as host devices, edge devices and/or other devices such as mobile telephones, laptop computers, tablet computers, desktop computers, Internet of things (IOT) devices, or other types of computing devices. Such devices are examples of what are more generally referred to herein as "processing devices." Some of these processing devices are also generally referred to herein as "computers." The edge orchestrators 102 and user devices 103 may comprise a network client that includes networking capabilities such as ethernet, Wi-Fi, etc. When the user devices 103, for example, are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary edge orchestrator 102 may comprise an orchestration module 107, a scheduling module 108 and a message processing module 109. In some embodiments, the orchestration module 107 manages one or more edge devices 114 in the edge network 110 (e.g., monitoring a status of the edge devices 114, onboarding new edge devices 114, managing metrics associated with the edge devices 114, and deploying software to the edge devices 114). The scheduling module 108 schedules one or more jobs associated with the edge devices 114. The message processing module 109 provides the disclosed message content reduction functionality for one or more messages in the information processing system 100, as discussed further below in conjunction with FIGS. 2 through 6C, for example.

It is to be appreciated that this particular arrangement of elements 107, 108 and 109 illustrated in the edge orchestrator 102 of the FIG. 1 embodiment is presented by way of example only, and alternative arrangements can be used in other embodiments. For example, the functionality associated with elements 107, 108 and 109 in other embodiments can be combined into a single element, or separated across a larger number of elements. As another example, multiple distinct processors can be used to implement different ones of elements 107, 108 and 109, or portions thereof.

At least portions of the orchestration module 107, the scheduling module 108 and/or the message processing module 109 may be implemented at least in part in the form of software that is stored in memory and executed by a processor. An exemplary process utilizing the orchestration module 107, the scheduling module 108, and the message processing module 109 of the edge orchestrator 102 in computer network 100 will be described in more detail with reference to FIGS. 2, 4 and 5, for example.

Other edge orchestrators 102 (not shown in FIG. 1) are assumed to be configured in a manner similar to that shown for edge orchestrator 102 in the figure.

As shown in FIG. 1, an exemplary edge network 110 may comprise a plurality of edge sites 112-1 through 112-N, collectively referred to herein as edge sites 112. In the example of FIG. 1. each edge site 112 comprises a respective plurality of edge devices 114-1-1 through 114-1-P and edge devices 114-N-1 through 114-N-Q, collectively referred to herein as edge devices 114.

Additionally, the edge orchestrator 102 and/or the edge network 110 (or portions thereof) can have an associated message template cache 106 configured to store, for example, message templates utilized to perform the disclosed message content reduction techniques. The message template cache 106 may be maintained by and accessible by, for example, one or more edge orchestrators 102. The message template cache 106 in the present embodiment is implemented using one or more storage systems associated with the information processing system 100. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more edge orchestrators 102, user devices 103 and/or edge networks 110 may be implemented on a common processing platform, or on separate processing platforms. The one or more edge orchestrators 102 and user devices 103 may be configured to interact over the network 104 in at least some embodiments with the edge network 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more edge orchestrators 102 and/or user devices 103, for example, can be one or more input-output devices (not shown), which illustratively comprise keyboards, displays or other types of input-output devices in any combination. Such input-output devices can be used, for example, to support one or more user interfaces to the edge network 110, as well as to support communication between the edge network 110 and other related systems and devices not explicitly shown.

The one or more edge orchestrators 102, user devices 103 and/or edge networks 110 in the FIG. 1 embodiment are assumed to be implemented using at least one processing device. Each such processing device generally comprises at least one processor and an associated memory and implements one or more functional modules for controlling certain features of the respective device.

More particularly, the one or more edge orchestrators 102, user devices 103 and/or edge networks 110 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more edge orchestrators 102, user devices 103 and/or edge networks 110 to communicate in some embodiments over the network 104 with each other (as well as one or more other networked devices, not shown), and illustratively comprises one or more conventional transceivers.

It is to be understood that the particular set of elements shown in FIG. 1 for message content reduction using message templates is presented by way of illustrative example only, and in other embodiments additional or alternative elements may be used. Thus, another embodiment includes additional or alternative systems, devices and other network entities, as well as different arrangements of modules and other components.

Figure 2:
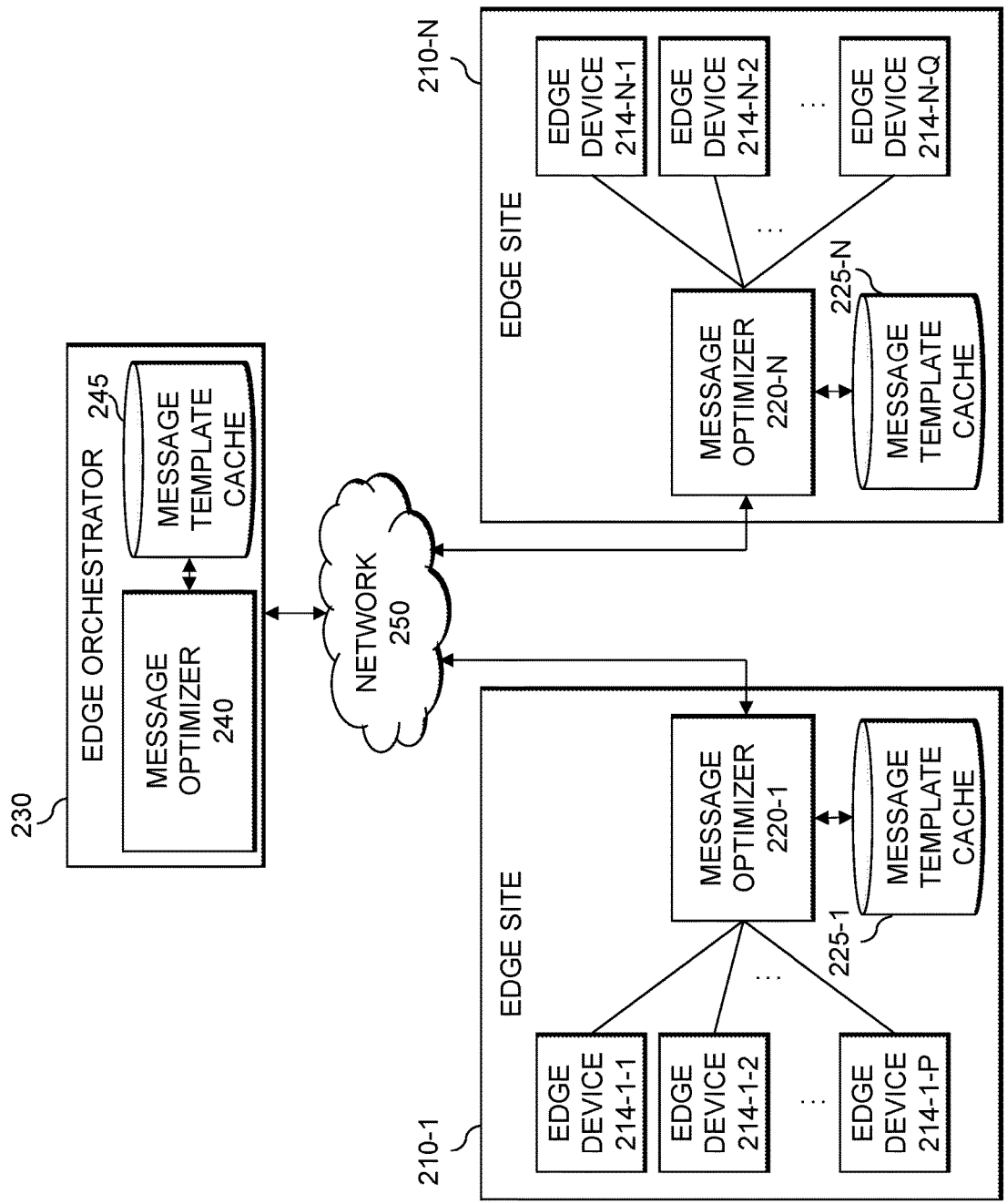
FIG. 2 illustrates portions of the information processing system of FIG. 1 in further detail in an illustrative embodiment.

FIG. 2 illustrates an edge orchestrator 230 communicating over a network 250 with edge devices 214-1-1 through 214-1-P, associated with a first edge site 210-1, and edge devices 214-N-1 through 214-N-Q, associated with a different edge site 210-N, in an illustrative embodiment. In the example of FIG. 2, the first edge site 210-1 comprises a message optimizer 220-1 and the different edge site 210-N comprises a message optimizer 220-N. The message optimizer 220-1 implements the disclosed message content reduction techniques for the edge devices 214-1-1 through 214-1-P associated with the first edge site 210-1, using a message template cache 225-1, and the message optimizer 220-N implements the disclosed message content reduction techniques for the edge devices 214-N-1 through 214-N-Q associated with the different edge site 210-N, using a message template cache 225-N.

The edge orchestrator 230 comprises a message optimizer 240 that implements the disclosed message content reduction techniques for the edge orchestrator 230 using a message template cache 245.

It is to be appreciated that this particular arrangement of message optimizers 220-1 through 220-N and message template caches 225-1 through 225-N associated with respective edge sites 210, and message optimizer 240 and message template cache 245 associated with the edge orchestrator 230 is presented by way of example only, and alternative arrangements can be used in other embodiments. For example, the functionality associated with message optimizers 220-1 through 220-N and 240 and message template caches 225-1 through 225-N and 245 in other embodiments can be combined into a single respective element (e.g., a single system-wide message optimizer 220, 240 and a single system-wide message template cache 225, 245), or separated across a larger number of elements. As another example, each edge device 214-1-1 through 214-1-P and 214-N-1 through 214-N-Q can have a dedicated message optimizer 220 and message template cache 225, making the edge devices 214 more autonomous, in a similar manner as the edge orchestrator 230.

In some embodiments, the message optimizers 220 of the respective edge sites 210 are placed on an external network connection of a far edge network (e.g., of the edge sites 210) with the edge orchestrator 230. The message optimizers 220 act as a proxy and receive outgoing messages from the respective edge device 214, cache the outgoing messages from the various edge devices 214 and reduce the content of the outgoing messages using the disclosed message content reduction techniques. Likewise, when the message arrives to the edge orchestrator 230, for example, the message optimizer 240 associated with the edge orchestrator 230 receives the message, recreates the original message using the message template cache and provides the reconstructed message to the edge orchestrator 230.

Figure 3:
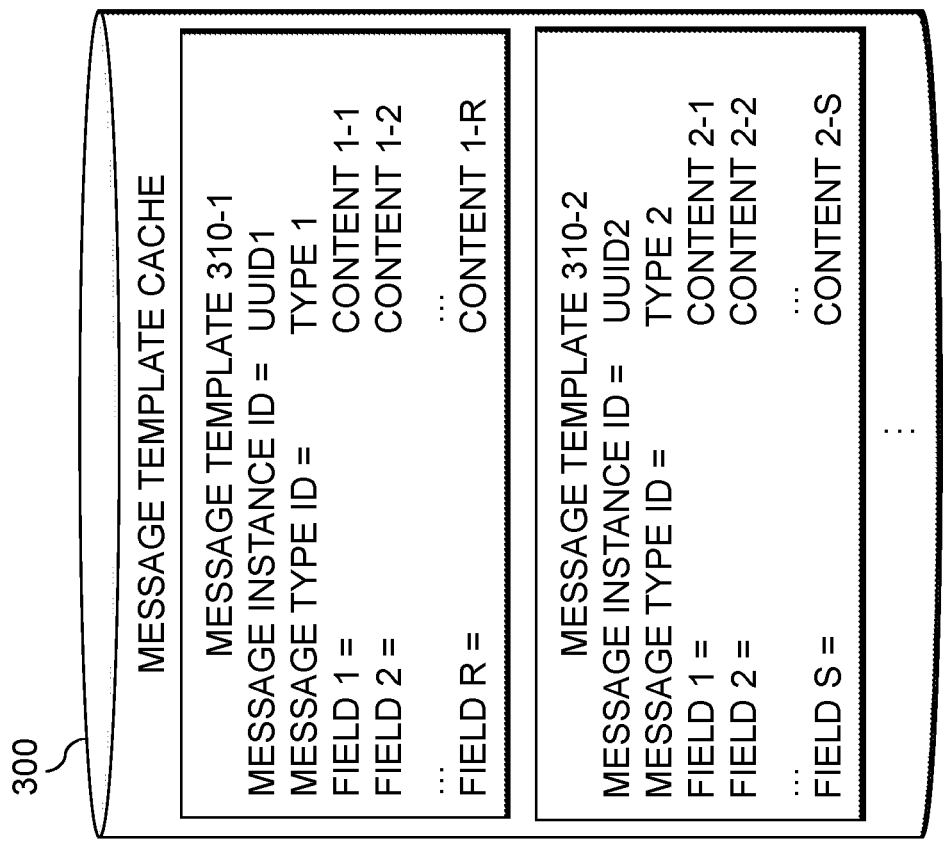
FIG. 3 illustrates the message template cache of FIG. 1 in further detail in an illustrative embodiment.

FIG. 3 illustrates a message template cache 300 in an illustrative embodiment. In some embodiments, each message type is classified by a corresponding message type identifier.

Generally, messages of the same message type comprise the same (or substantially similar) fields and have a similar purpose. Each sent message has a unique message instance identifier. A messages retention period for retaining messages in a given message template cache 300 may be specified. The distributed message template caches may share the same retention period, in some embodiments.

In the example of FIG. 3, the message template cache 300 comprises a first message template 310-1 having a message instance identifier of UUID1 and a message type identifier of TYPE 1. The first message template 310-1 comprises fields 1 through R comprising respective content 1-1 through content 1-R.

The message template cache 300 of FIG. 3 also comprises a second message template 310-2. The second message template 310-2 has a message instance identifier of UUID2 and a message type identifier of TYPE 2. The second message template 310-2 comprises fields 1 through S comprising respective content 2-1 through content 2-S.

In some embodiments, the message type identifier can be obtained by applying a hash function (e.g., a SHA-256 hash function) to the original message to obtain a hash value as the message type identifier. In one or more embodiments, a given hash value points to a given collection (or bucket) of messages corresponding to a particular message type. Thus, each collection may comprise one prototype message in some embodiments and a message to be sent may be assigned to a particular collection based on the hash value of the message (and one of the messages from the particular collection may be selected as a base message (e.g., a template message) based on a similarity between the message and the selected base message).

Figure 4:
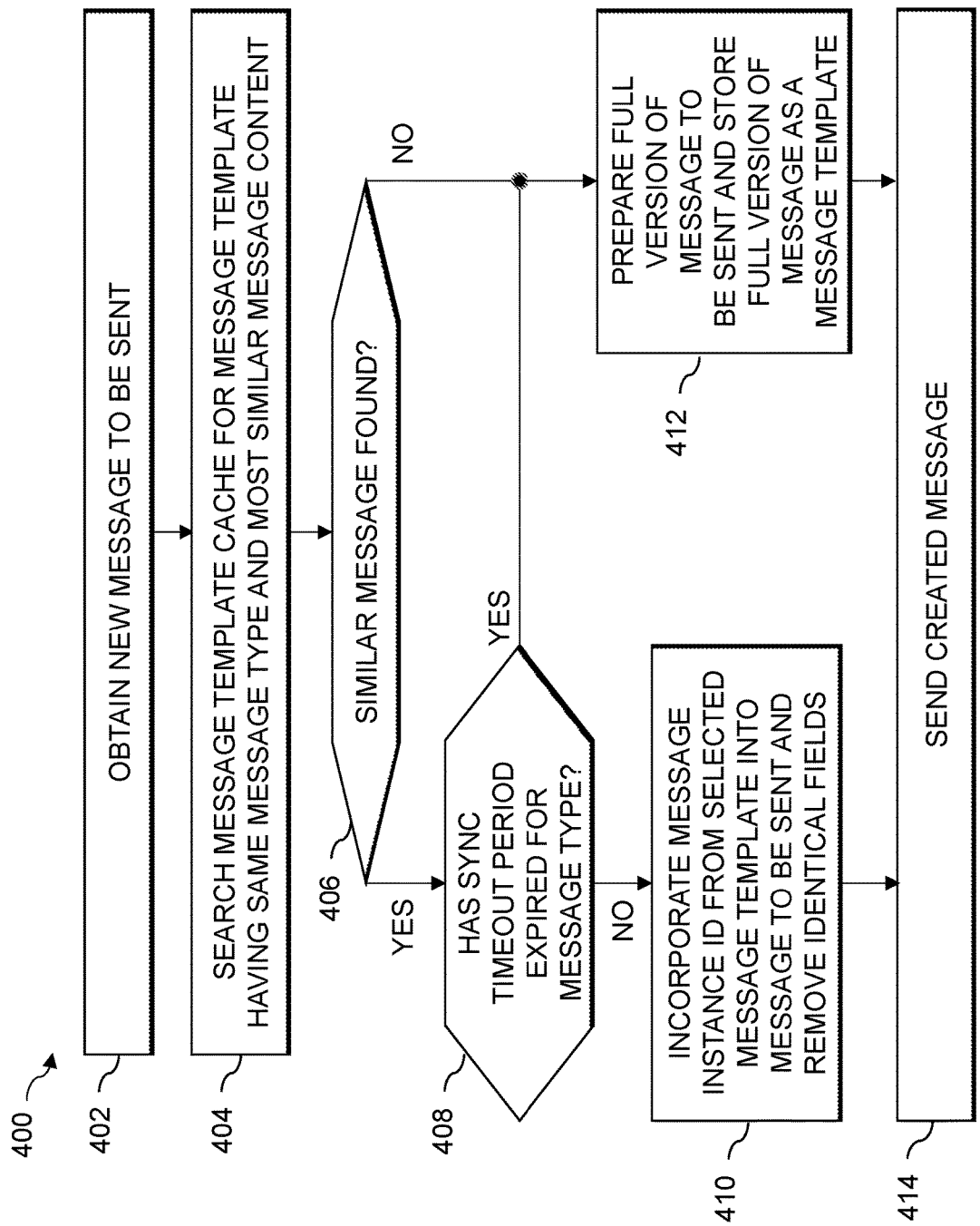
FIG. 4 is a flow chart illustrating an exemplary implementation of a message transmission process in an illustrative embodiment.

FIG. 4 is a flow chart illustrating an exemplary implementation of a message transmission process 400 in an illustrative embodiment. The message transmission process 400 may be implemented in some embodiments by the message optimizer associated with the sending device (e.g., an edge device). Generally, a sending component (e.g., an edge device) creates a new message, and a message optimizer associated with the sending component searches the message template cache associated with the sending component for a message template of the same message type and also having a most similar message content to the created message. In at least some embodiments, a ranking of similar messages will rank message templates having a higher number of similar fields with a higher ranking. The message optimizer will then update the created message by (i) incorporating the message instance identifier of the selected message template from the message template cache to a cached message instance identifier field of the created message and (ii) removing any fields in the created message that match (e.g., are identical to) the selected message template. If the message template cache is empty or no similar messages are found, the message optimizer will send a full snapshot of the created message (and also store the full snapshot of the created message as a message template).

In the example of FIG. 4, the message transmission process 400 obtains a new message to be sent in step 402. The message template cache is searched in step 404 for a message template having a same message type and a most similar message content as the obtained message.

A test is performed in step 406 to determine if a similar message is found in the message template cache. If it is determined in step 406 that a similar message was found, then a further test is performed in step 408 to determine if a designated synchronization timeout period, if any, has expired for the message type. In order for new components or re-connected components to be able to synchronize and use the disclosed message content reduction techniques in the network, a defined timeout period may be defined for sending snapshots (e.g., sending the full message). In step 408, a determination may be made as to when was the last time the full message was sent for the same message type (e.g., when the timeout period for the message type has expired, a full message will be sent).

If it is determined in step 408 that the designated synchronization timeout period has not expired for the message type, then obtained message will be composed in step 410 using the disclosed message content reduction techniques by incorporating the message instance identifier from the selected message template into the message to be sent and removing one or more identical fields. The created message is then sent in step 414.

If, however, it is determined in step 406 that a similar message was not found, or if it is determined in step 408 that the designated synchronization timeout period has expired for the message type, then a full version of the message to be sent is prepared in step 412 and the full version of the message is stored as a message template (e.g., with a new message type identifier, such as a hash value of the full version of the message). The full version of the message is then sent in step 414.

Figure 5:
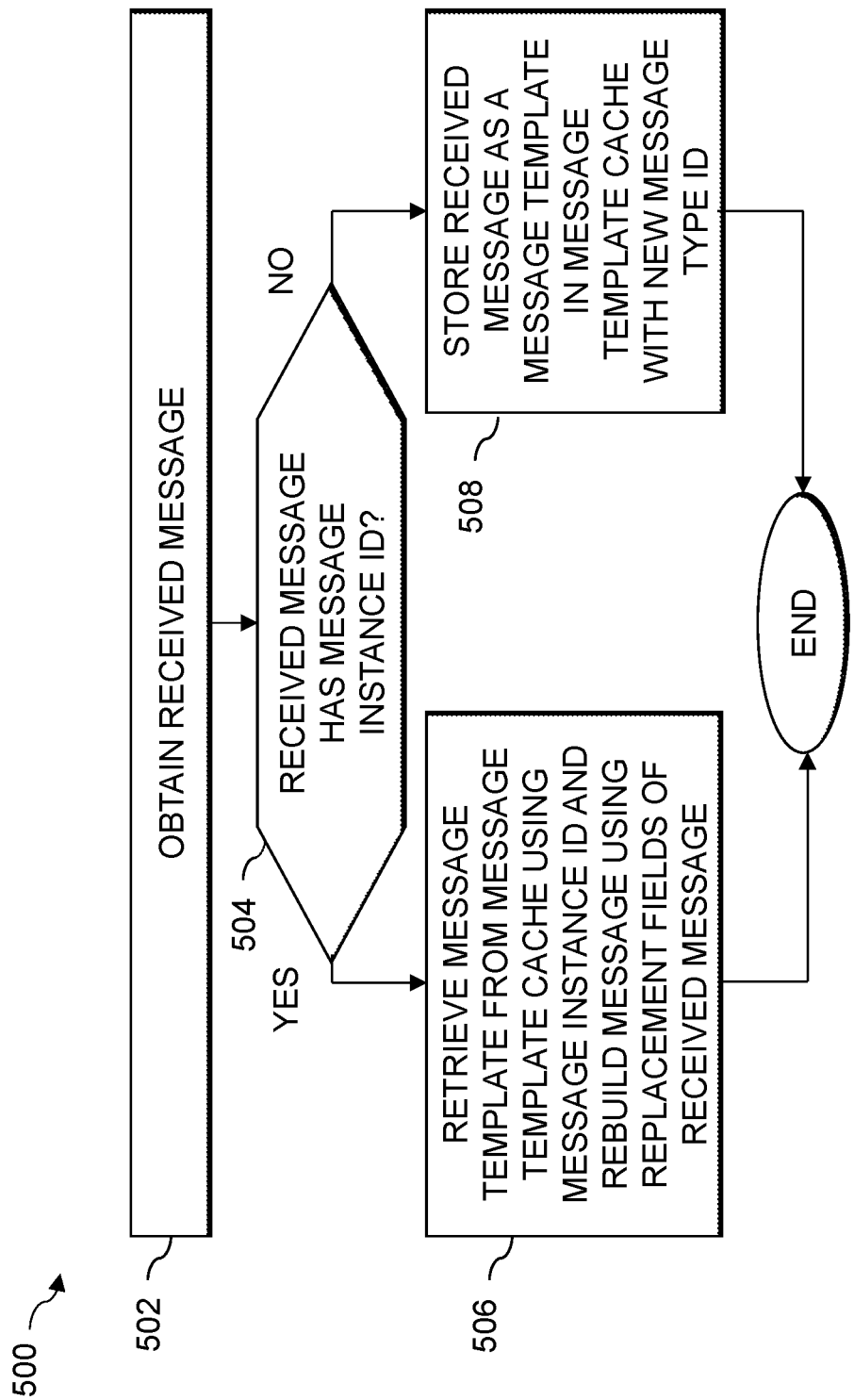
FIG. 5 is a flow chart illustrating an exemplary implementation of a process for reconstructing a received message in an illustrative embodiment.
Figure 6:
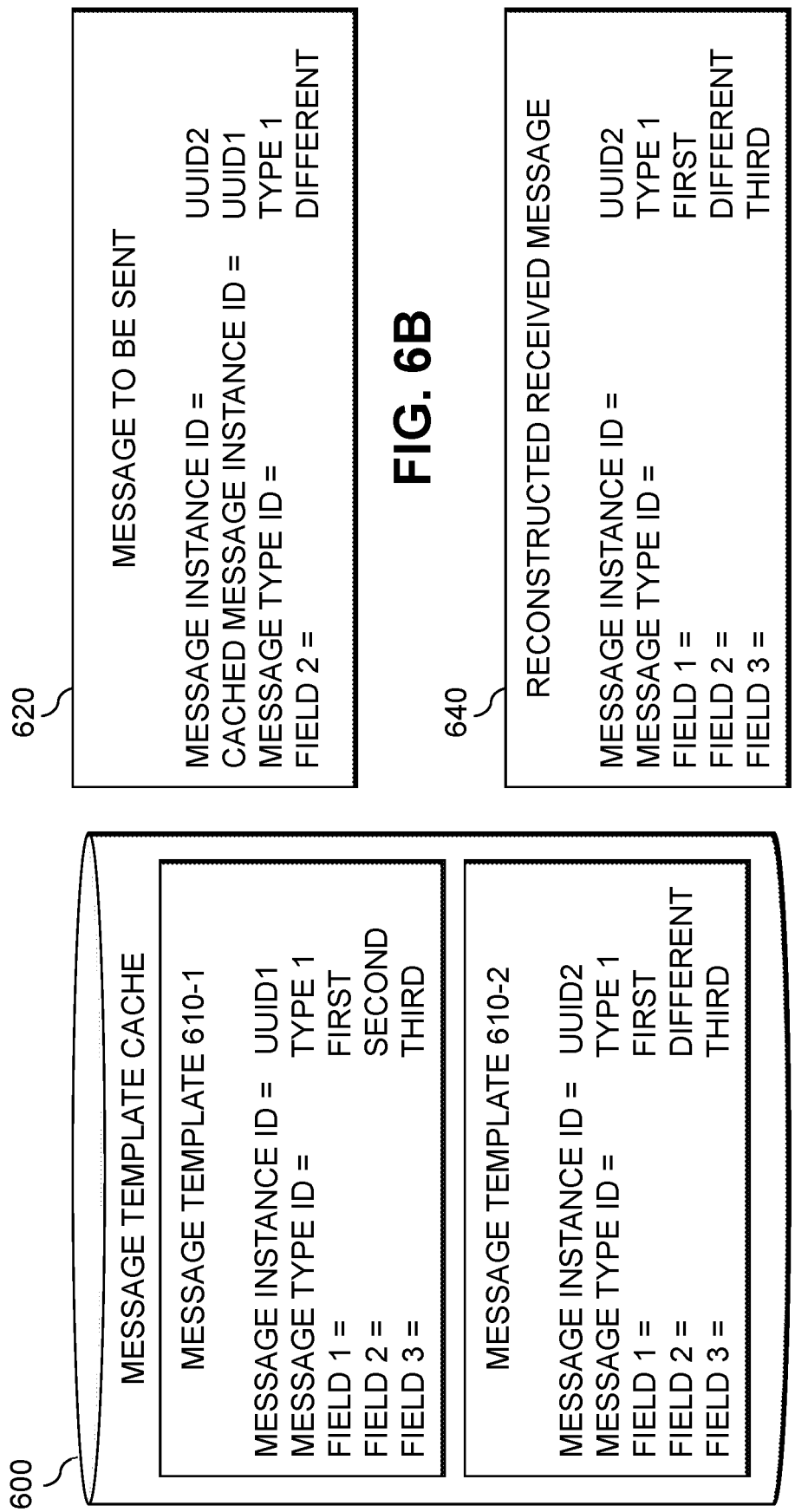
FIGS. 6A through 6C illustrate an exemplary processing of a message to be sent and a reconstruction of a received message using a message template cache in an illustrative embodiment.

FIG. 5 is a flow chart illustrating an exemplary implementation of a process 500 for reconstructing a received message in an illustrative embodiment. The process 500 may be implemented in some embodiments by the message optimizer associated with the recipient device (e.g., an edge device). In at least some embodiments, the presence of a cached message instance identifier in a received message provides an indication that the received message was sent using the disclosed message content reduction techniques. Thus, when a received message does not have a cached message instance identifier, the message was not optimized using the disclosed techniques and the received message will be stored in the message template cache. When a received message has a cached message instance identifier, the message was optimized using the disclosed techniques and the original message will be reconstructed from received message by retrieving the message template with the same message instance identifier from the message template cache for use as a base message and replacing one more fields of the base message using the populated fields of the received message.

In the example of FIG. 5, the process 500 obtains a received message in step 502. A test is performed in step 504 to determine if the received message has a message instance identifier. If it is determined in step 504 that the received message has a message instance identifier, then the corresponding message template is retrieved from the message template cache in step 506 using the message instance identifier and the message is rebuilt using one or more replacement fields of the received message (e.g., by restoring missing fields of the received message with corresponding fields from the retrieved message template). Program control then ends.

If, however, it is determined in step 504 that the received message does not have a message instance identifier, then the received message is stored in step 508 as a message template in the message template cache with a new message type identifier (e.g., with a new message type identifier, such as a hash value of the received message). In this manner, each entity builds up the respective message template cache over time. Program control then ends.

FIGS. 6A through 6C illustrate an exemplary processing of a message 620 to be sent and a reconstructed received message 640 using a message template cache 600 in an illustrative embodiment. In the example of FIG. 6A, the message template cache 600 initially comprises a first message template 610-1 having a message instance identifier of UUID1 and a message type identifier of TYPE 1. The first message template 610-1 in the message template cache 600 comprises fields 1 through 3 with respective values of first, second and third. The message 620 to be sent by a sending device is populated with a message instance identifier of UUID2 and a cached message instance identifier of UUID1 (indicating that the base message from the message template cache 600 had a message instance identifier of UUD1). The message 620 to be sent is assigned a message type identifier of TYPE 1. The second field (field 2) of message 620 is the only different field relative to the first message template 610-1 and has content of "different".

The message 620 is received by a recipient device which generates a reconstructed received message 640 from message 620, using the message template cache 600 with a message instance identifier of UUD1 from the message template cache 600. The reconstructed received message 640 comprises a message instance identifier of UUID2 and a message type identifier of TYPE 1. The first field (field 1) of the reconstructed received message 640 is populated using the "first" value from the first message template 610-1 and the third field (field 3) of the reconstructed received message 640 is populated using the "third" value from the first message template 610-1. In addition, since the second field (field 2) of the reconstructed received message 640 has a "different" value, the second field is populated using the received "different" value. The reconstructed received message 640 is then stored in the message template cache 600 as a message template 610-2. In this manner, a received message of the same type and different content relative to a message in the message template cache is also cached in the message template cache 600.

In one or more embodiments, a component message template cache holds a defined number of messages and generates new messages based on the most similar cached message, including the message type identifier and unique fields. A "message incremental" refers to the difference in data between a cached existing message and a new message. In some embodiments, the message type identifier is obtained using a hash function, as noted above. A hash value may not be unique for every message, and thus the hash value may identify a collection (e.g., a bucket) of related messages. The particular hash function employed may be varied to obtain a desired collision probability for any message, for example.

In a pre-deployment phase, the following process to generate a message template cache that will be used as a prototype (e.g., a collection of base messages) in the deployment phase. During the pre-deployment phase, a message to be sent (e.g., without an existing prototype) is processed by a first component (e.g., Component A) by generating a new message, X, and applying a hash function over message X resulting in a hash key X. Assume that Component A searches the message template cache associated with key X and does not find a related prototype value. Component A then stores the new message in the message template cache using a message pair comprising Hash key X->Prototype X (e.g., Message X or a variation thereof) and sends the message pair to a second component (e.g., Component B), for example, in the near edge.

Component B receives the message and stores the message in a near edge message template cache as the message pair Hash X->Prototype X.

In a system deployment phase, the message template cache generated in the pre-deployment phase is available for use. The following message sending algorithm may be used to reduce the amount of data sent over a network. Component A generates a new message Y.

Component A applies the hash function over Message Y to obtain a hash number Hash Y. Component A searches in the message template cache for a key value of Hash Y and finds a related value Prototype1. Component A compresses Message Y by using related hash number Hash1 as a message type identifier and adding the fields that are different from Prototype Y (providing a message referred to as CompressedMessage2), Component A sends Compressed Message Y to recipient device Component B. Component B receives Compressed Message Y and uses the message template cache, for example, of the near edge, to retrieve the message Prototype Y. Component B generates Message Y using Prototype Y and by adding/replacing fields taken from Compressed Message Y that are not the same.

Figure 7:
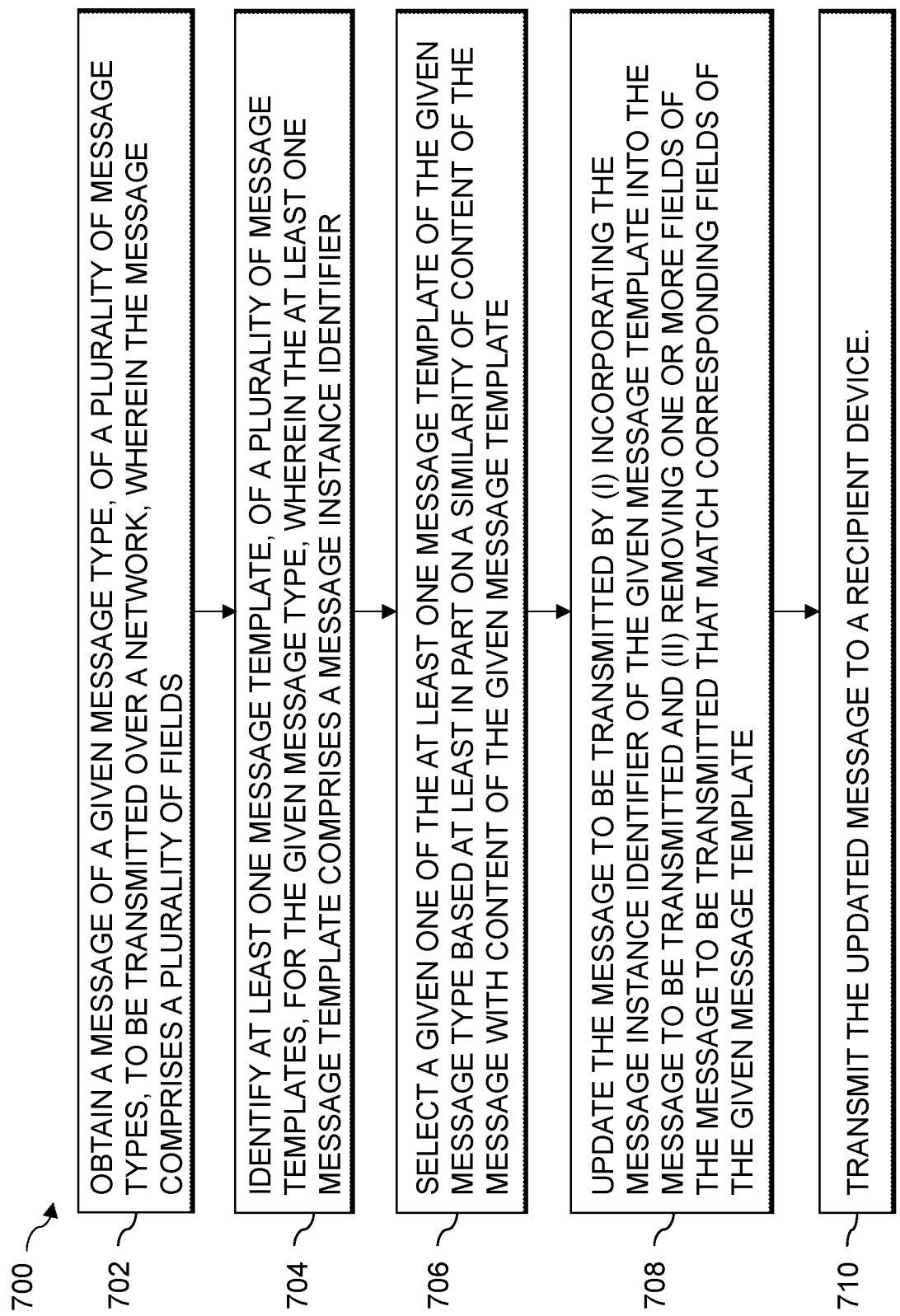
FIG. 7 is a flow chart illustrating an exemplary implementation of a process for message content reduction using message templates in an illustrative embodiment.

FIG. 7 is a flow chart illustrating an exemplary implementation of a process 700 for message content reduction using message templates in an illustrative embodiment. The process 700 may be performed, for example, by a message optimizer of FIG. 2. In the example of FIG. 7, the process 700 obtains, in step 702, a message of a given message type, of a plurality of message types, to be transmitted over a network, wherein the message comprises a plurality of fields. In step 704, at least one message template, of a plurality of message templates, is identified for the given message type, wherein the at least one message template comprises a message instance identifier.

A given one of the at least one message template of the given message type is selected in step 706 based at least in part on a similarity of content of the message with content of the given message template. The message to be transmitted is updated in step 708 by (i) incorporating the message instance identifier of the given message template into the message to be transmitted and (ii) removing one or more fields of the message to be transmitted that match corresponding fields of the given message template. The updated message is transmitted to a recipient device in step 710.

In some embodiments, the method further comprises determining whether a message cache storing the plurality of message templates comprises a message template of the given message type. The message of the given message type may be stored as a message template in the message cache (e.g., message template cache 600) in response to the message cache not comprising a message of the given message type. A determination may be made of whether a synchronization timeout period, for the given message type, has been exceeded and the message (e.g., the full message) may be transmitted to the recipient device in response to the synchronization timeout period being exceeded.

In one or more embodiments, the recipient device determines whether the updated message comprises the message instance identifier. The recipient device may retrieve a message template from the message cache corresponding to the message instance identifier in response to the updated message comprising the message instance identifier. The recipient device may store the updated message as a message template in the message cache in response to the updated message not being in the message cache.

In at least one embodiment, the message type identifier of the at least one message template is based at least in part on a message-dependent function (e.g., a hash function) applied to content of the at least one message template. The given message type of the message to be transmitted may be obtained by applying the message-dependent function to the message to be transmitted to obtain a message-dependent value (e.g., a hash value), wherein the identifying the at least one message template for the given message type may comprise identifying a collection (e.g., a bucket) of the at least one message template using the message-dependent value and the selecting the given message template of the given message type may be based at least in part on a similarity of content of the message to be transmitted relative to content of the of the at least one message in the collection.

The particular processing operations and other network functionality described in conjunction with FIGS. 4, 5 and 7, for example, are presented by way of illustrative example only, and should not be construed as limiting the scope of the disclosure in any way. Alternative embodiments can use other types of processing operations for message content reduction using message templates. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, incremental data transfers are performed by reusing message templates (or portions thereof) from a message template cache to reduce the amount of data that needs to be transmitted and processed. Among other benefits, the disclosed techniques for message content reduction using message templates improves the use of network bandwidth, enables messages to be sent in edge locations with poor network connectivity, improves security by sending fragmented data over the network; and improves a user experience by reducing the latency.

One or more embodiments of the disclosure provide improved methods, apparatus and computer program products for message content reduction using message templates. The foregoing applications and associated embodiments should be considered as illustrative only, and numerous other embodiments can be configured using the techniques disclosed herein, in a wide variety of different applications.

It should also be understood that the disclosed message content reduction techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for message content reduction using message templates may be implemented using one or more processing platforms. One or more of the processing modules or other components may therefore each run on a computer, storage device or other processing platform element. A given such element may be viewed as an example of what is more generally referred to herein as a "processing device." As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based message content reduction engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based message content reduction platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
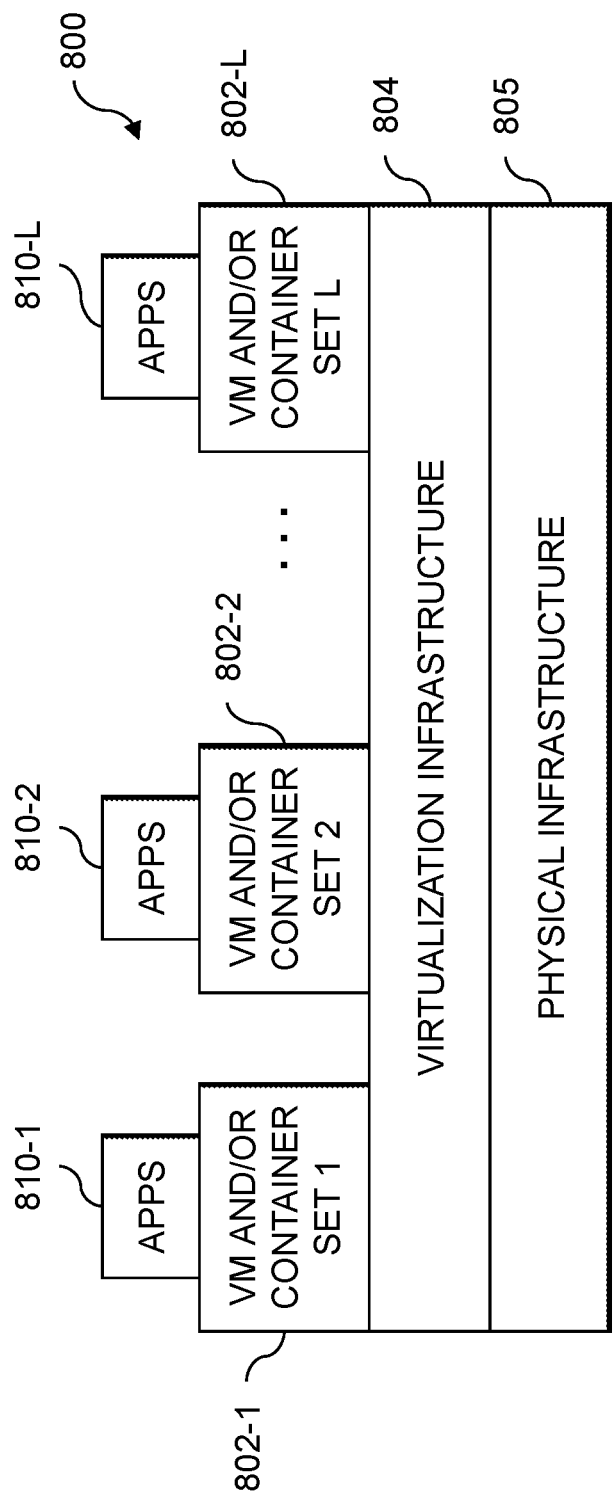
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2 . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1. 810-2, . . . 810-L running on respective ones of the VMs/container sets 802-1, 802-2 . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide message content reduction functionality of the type described above for one or more processes running on a given one of the VMs. For example, each of the VMs can implement message content reduction control logic and associated message reconstruction functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide message content reduction and mitigation functionality of the type described above for one or more processes running on different ones of the containers. For example, a container host device supporting multiple containers of one or more container sets can implement one or more instances of message content reduction control logic and associated message reconstruction functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K. which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an ASIC, an FPGA or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
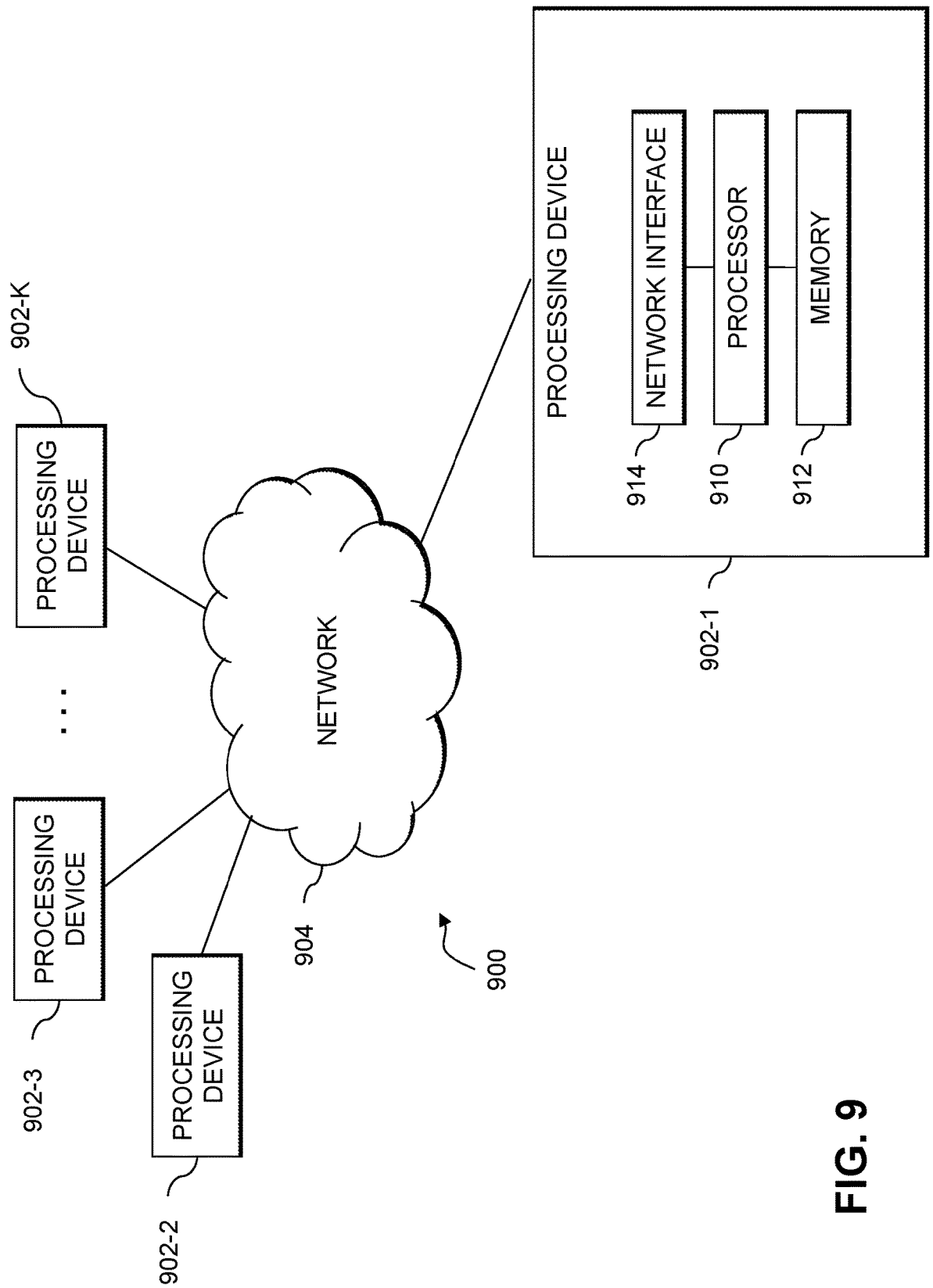
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a message of a given message type, of a plurality of message types, to be transmitted over a network, wherein the message comprises a plurality of fields;
identifying at least one message template, of a plurality of message templates, for the given message type, wherein the at least one message template comprises a message instance identifier;
selecting a given one of the at least one message template of the given message type based at least in part on a similarity of content of the message with content of the given message template;
updating the message to be transmitted by (i) incorporating the message instance identifier of the given message template into the message to be transmitted and (ii) removing one or more fields of the message to be transmitted that match corresponding fields of the given message template; and
transmitting the updated message to a recipient device, wherein the recipient device determines whether the updated message comprises the message instance identifier and retrieves a message template, from a message cache, corresponding to the message instance identifier in response to the updated message comprising the message instance identifier;
wherein the method is performed by at least one processing device comprising a processor coupled to a memory.

2. The method of claim 1, further comprising determining whether a message cache storing the plurality of message templates comprises a message template of the given message type.

3. The method of claim 2, further comprising storing the message of the given message type as a message template in the message cache in response to the message cache not comprising a message of the given message type.

4. The method of claim 1, wherein the recipient device stores the updated message as a message template in a message cache in response to the updated message not being in the message cache.

5. The method of claim 1, wherein a message type identifier of the at least one message template is based at least in part on a message-dependent function applied to content of the at least one message template.

6. The method of claim 5, wherein the given message type of the message to be transmitted is obtained by applying the message-dependent function to the message to be transmitted to obtain a message-dependent value, wherein the identifying the at least one message template for the given message type comprises identifying a collection of the at least one message template using the message-dependent value and wherein the selecting the given message template of the given message type is based at least in part on a similarity of content of the message to be transmitted relative to content of the of the at least one message template in the collection.

7. The method of claim 1, further comprising determining whether a synchronization timeout period, for the given message type, has been exceeded and transmitting the message to the recipient device in response to the synchronization timeout period being exceeded.

8. An apparatus comprising:
at least one processing given device comprising a processor coupled to a memory;
the at least one processing given device being configured to implement the following steps:
obtaining a message of a given message type, of a plurality of message types, to be transmitted over a network, wherein the message comprises a plurality of fields;
identifying at least one message template, of a plurality of message templates, for the given message type, wherein the at least one message template comprises a message instance identifier;
selecting a given one of the at least one message template of the given message type based at least in part on a similarity of content of the message with content of the given message template;
updating the message to be transmitted by (i) incorporating the message instance identifier of the given message template into the message to be transmitted and (ii) removing one or more fields of the message to be transmitted that match corresponding fields of the given message template; and
transmitting the updated message to a recipient device, wherein the recipient device determines whether the updated message comprises the message instance identifier and retrieves a message template, from a message cache, corresponding to the message instance identifier in response to the updated message comprising the message instance identifier.

9. The apparatus of claim 8, further comprising determining whether a message cache storing the plurality of message templates comprises a message template of the given message type and storing the message of the given message type as a message template in the message cache in response to the message cache not comprising a message of the given message type.

10. The apparatus of claim 8, wherein a message type identifier of the at least one message template is based at least in part on a message-dependent function applied to content of the at least one message template.

11. The apparatus of claim 10, wherein the given message type of the message to be transmitted is obtained by applying the message-dependent function to the message to be transmitted to obtain a message-dependent value, wherein the identifying the at least one message template for the given message type comprises identifying a collection of the at least one message template using the message-dependent value and wherein the selecting the given message template of the given message type is based at least in part on a similarity of content of the message to be transmitted relative to content of the of the at least one message template in the collection.

12. The apparatus of claim 8, further comprising determining whether a synchronization timeout period, for the given message type, has been exceeded and transmitting the message to the recipient device in response to the synchronization timeout period being exceeded.

13. The apparatus of claim 8, wherein the recipient device stores the updated message as a message template in a message cache in response to the updated message not being in the message cache.

14. The apparatus of claim 8, wherein the plurality of message templates is stored in the message cache.

15. A non-transitory processor-readable storage medium having stored therein program code of one or more software programs, wherein the program code when executed by at least one processing given device causes the at least one processing given device to perform the following steps:
   obtaining a message of a given message type, of a plurality of message types, to be transmitted over a network, wherein the message comprises a plurality of fields;
   identifying at least one message template, of a plurality of message templates, for the given message type, wherein the at least one message template comprises a message instance identifier;
   selecting a given one of the at least one message template of the given message type based at least in part on a similarity of content of the message with content of the given message template;
   updating the message to be transmitted by (i) incorporating the message instance identifier of the given message template into the message to be transmitted and (ii) removing one or more fields of the message to be transmitted that match corresponding fields of the given message template; and
   transmitting the updated message to a recipient device, wherein the recipient device determines whether the updated message comprises the message instance identifier and retrieves a message template, from a message cache, corresponding to the message instance identifier in response to the updated message comprising the message instance identifier.

16. The non-transitory processor-readable storage medium of claim 15, further comprising determining whether a message cache storing the plurality of message templates comprises a message template of the given message type and storing the message of the given message type as a message template in the message cache in response to the message cache not comprising a message of the given message type.

17. The non-transitory processor-readable storage medium of claim 15, wherein a message type identifier of the at least one message template is based at least in part on a message-dependent function applied to content of the at least one message template, wherein the given message type of the message to be transmitted is obtained by applying the message-dependent function to the message to be transmitted to obtain a message-dependent value, wherein the identifying the at least one message template for the given message type comprises identifying a collection of the at least one message template using the message-dependent value and wherein the selecting the given message template of the given message type is based at least in part on a similarity of content of the message to be transmitted relative to content of the of the at least one message template in the collection.

18. The non-transitory processor-readable storage medium of claim 15, further comprising determining whether a synchronization timeout period, for the given message type, has been exceeded and transmitting the message to the recipient device in response to the synchronization timeout period being exceeded.

19. The non-transitory processor-readable storage medium of claim 15, wherein the recipient device stores the updated message as a message template in a message cache in response to the updated message not being in the message cache.

20. The non-transitory processor-readable storage medium of claim 15, wherein the plurality of message templates is stored in the message cache.

* * * * *